United States Patent
Kim et al.

(10) Patent No.: US 10,408,337 B2
(45) Date of Patent: Sep. 10, 2019

(54) MOVABLE SWITCH MODULE FOR AUTOMATIC TRANSMISSION OF VEHICLE

(71) Applicant: Hyundai Motor Company, Seoul (KR)

(72) Inventors: Eun Sik Kim, Gyeonggi-do (KR); Jeong Seop Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 527 days.

(21) Appl. No.: 15/186,701

(22) Filed: Jun. 20, 2016

(65) Prior Publication Data
US 2017/0138462 A1    May 18, 2017

(30) Foreign Application Priority Data
Nov. 18, 2015    (KR) .......................... 10-2015-0161704

(51) Int. Cl.
*F16H 59/02*    (2006.01)
*F16H 59/08*    (2006.01)

(52) U.S. Cl.
CPC ......... *F16H 59/0217* (2013.01); *F16H 59/08* (2013.01)

(58) Field of Classification Search
CPC . F16H 59/0217; F16H 59/08; F16H 2059/081
USPC ................................ 74/473.12, 473.3, 473.1
See application file for complete search history.

(56) References Cited

U.S. PATENT DOCUMENTS

| | | | | |
|---|---|---|---|---|
| 6,601,685 | B2 * | 8/2003 | Nagasaka | B60K 37/06 180/315 |
| 7,544,123 | B2 * | 6/2009 | Krause | B60H 1/3421 454/310 |
| 8,170,757 | B2 * | 5/2012 | Furhoff | B60K 37/06 70/248 |

(Continued)

FOREIGN PATENT DOCUMENTS

| CN | 101341357 A | 1/2009 |
|---|---|---|
| CN | 103671866 A | 3/2014 |

(Continued)

OTHER PUBLICATIONS

"Chinese Office Action issued in Chinese Patent Application No. 201610560446.9", dated May 20, 2019, 10 pages of official copy only.

*Primary Examiner* — Jake Cook
*Assistant Examiner* — Gregory Robert Weber
(74) *Attorney, Agent, or Firm* — Mintz Levin Cohn Ferris Glovsky and Popeo, P.C.; Peter F. Corless

(57) ABSTRACT

A movable switch module for an automatic transmission of a vehicle includes an actuating cylinder including a body and a rod extendable to a vehicle interior space through the center fascia, a body rotating unit provided at the body of the actuating cylinder, a switch box connected to an end of the rod, to move in accordance with operation of the actuating cylinder, and provided with switches at one side of the switch box, a pressure-sensitive touch pad disposed in the interior space at a position spaced apart from the center (Continued)

fascia, to sense a variation in pressure applied thereto, and a controller for controlling the actuating cylinder and the body rotating unit when sensing an intention of a driver to operate one switch, based on a signal from the touch pad, to control the switch box to protrude to a position where a hand of the driver is located.

11 Claims, 5 Drawing Sheets

(56) References Cited

U.S. PATENT DOCUMENTS

| | | | | |
|---|---|---|---|---|
| 8,601,896 | B2* | 12/2013 | Skogward | B60K 20/04 |
| | | | | 74/473.23 |
| 8,960,361 | B2* | 2/2015 | Helot | B60K 20/02 |
| | | | | 180/326 |
| 9,809,231 | B2* | 11/2017 | Ling | B60W 50/10 |
| 2002/0152827 | A1* | 10/2002 | Hayashi | F16H 59/0278 |
| | | | | 74/473.3 |
| 2007/0204718 | A1* | 9/2007 | Strait | B60R 25/066 |
| | | | | 74/523 |
| 2014/0090504 | A1* | 4/2014 | Huth | F16H 59/0217 |
| | | | | 74/473.19 |
| 2015/0053038 | A1* | 2/2015 | Kim | F16H 59/105 |
| | | | | 74/473.3 |

FOREIGN PATENT DOCUMENTS

| | | | | |
|---|---|---|---|---|
| DE | 102006019065 A1 * | 10/2007 | | F16H 59/02 |
| JP | 2002-254950 A | 9/2002 | | |
| JP | 2002254950 A * | 9/2002 | | |
| JP | 2006-044374 A | 2/2006 | | |
| KR | 10-2013-0040343 A | 4/2013 | | |
| KR | 10-2013-0063830 A | 6/2013 | | |
| KR | 10-2013-0117401 A | 10/2013 | | |
| KR | 10-1410663 B1 | 6/2014 | | |
| KR | 2015-0069294 A | 6/2015 | | |
| WO | 02/098693 A1 | 12/2002 | | |
| WO | WO-02098694 A1 * | 12/2002 | | B60K 20/02 |
| WO | 2011/138177 A1 | 11/2011 | | |

* cited by examiner

MOVABLE SWITCH MODULE FOR AUTOMATIC TRANSMISSION OF VEHICLE

CROSS-REFERENCE TO RELATED APPLICATION

This application claims under 35 U.S.C. § 119(a) the benefit of Korean Patent Application No. 10-2015-0161704, filed on Nov. 18, 2015 in the Korean Intellectual Property Office, the entire contents of which are incorporated by reference herein.

BACKGROUND

1. Field of the Invention

The present invention relates to a movable switch module for an automatic transmission of a vehicle, which can recognize a position of a hand of a driver, to be automatically extended to the hand position, and then automatically retracted after being operated.

2. Description of the Related Art

In a conventional electronic automatic transmission, the lever thereof protrudes upwards from a console surface and, as such, is operated in a similar manner to a conventional mechanical transmission lever. However, the lever of the electronic automatic transmission has no advantage over the lever of a conventional mechanical transmission because manipulation thereof is similar to that of the mechanical transmission lever. The transmission lever occupies a large area, and as such, the space for installing a cup holder or the like is reduced, and the layout space for arranging functional buttons is reduced.

Further, since the transmission lever is always in a protruding state, the head or other body part of a driver may be struck by the transmission lever in the event of a collision. In addition, since characters representing lever positions are indicated on a top surface of the protruded transmission lever, the characters are hidden by a hand of the driver when the driver shifts the transmission lever and, as such, lever position recognizability may be reduced.

The above matters disclosed in this section are merely for enhancement of understanding of the general background of the invention and should not be taken as an acknowledgement or any form of suggestion that the matters form the related art already known to a person skilled in the art.

SUMMARY

It is an object of the present invention to provide a movable switch module for an automatic transmission of a vehicle, which can recognize a position of a hand of a driver, to be automatically extended to the hand position, and then automatically retracted after being operated.

In accordance with the present invention, the above and other objects can be accomplished by the provision of a movable switch module for a vehicle including an actuating cylinder comprising a body disposed inside of a center fascia and a rod reciprocable such that the rod is extendable to an interior space of the vehicle through the center fascia, a body rotating unit provided at an outer circumferential surface of the body of the actuating cylinder while having a rotating shaft extending perpendicular to a longitudinal direction of the body, a switch box connected to an end of the rod of the actuating cylinder such that the switch box is moved in accordance with operation of the actuating cylinder, and provided with switches at one side of the switch box, a pressure-sensitive touch pad disposed in the interior space at a position spaced apart from the center fascia by a predetermined distance, to sense a variation in pressure applied thereto, and a controller for controlling the actuating cylinder and the body rotating unit when sensing an intention of a driver to operate one of the switches, based on a signal from the pressure-sensitive touch pad, to control the switch box to protrude to a position where a hand of the driver is located.

The controller may determine that the driver intends to operate the switch module, when the controller continuously receives, from the pressure-sensitive touch pad, a first pressure signal corresponding to a first predetermined pressure area or more and a second pressure signal corresponding to a second predetermined pressure area or more for a predetermined time or more.

The controller determines that the intention of the driver to operate the switch module has ended, when the controller continuously receives, from the pressure-sensitive touch pad, one first pressure signal corresponding to the first predetermined pressure area or more and two second pressure signals each corresponding to the second predetermined pressure area or more for a predetermined time or more, and then controls the actuating cylinder and the body rotating unit, based on the determination, to retract the switch box.

The switches provided at the switch box may include electronic gear shift switches.

The switches of the switch box may be arranged to be directed to one side of the center fascia.

A through hole may be formed through an outer wall of the switch box such that the through hole extends in a width direction of a vehicle body, to allow the rod of the actuating cylinder to be connected to an inside of the switch box through the through hole.

The movable switch module may further include rotational couplers provided at an end of the rod and the switch box, to couple the rod to the switch box such that the switch box is rotatable with respect to the end of the rod.

The through hole may be formed at a position biased to a right side in the width direction of the vehicle body.

The switch box may have a maximum rotation range adjustable in accordance with a length of the through hole extending in the width direction of the vehicle body.

The rotational couplers may include a coupling ring and a central protrusion, respectively, and the coupling ring is coupled to the protrusion while being fitted around the protrusion, to provide rotational force and coupling force between the actuating cylinder and the switch box.

Magnetic members having opposite polarities may be provided at an inner circumferential surface of the coupling ring and an outer circumferential surface of the central protrusion. The magnetic members provided at the inner circumferential surface of the coupling ring or and the outer circumferential surface of the central protrusion may be uniformly spaced apart from one another by a predetermined distance along the corresponding circumferential surface such that, when the switch box rotates, a rotation amount of the switch box is determined.

In accordance with the above-described movable switch module of the present invention, the position of the hand of the driver is recognized, to move a switch box thereof based on the recognized hand position, and, as such, convenience is enhanced. In addition, when the switch box is not used, the switch box is automatically retracted and, as such, the space occupied by the switch box in conventional cases can be utilized for other purposes.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present invention associated with a movable switch module for an automatic transmission of a vehicle, examples of which are illustrated in the accompanying drawings. Wherever possible, the same reference numbers will be used throughout the drawings to refer to the same or like parts.

Figure 1:
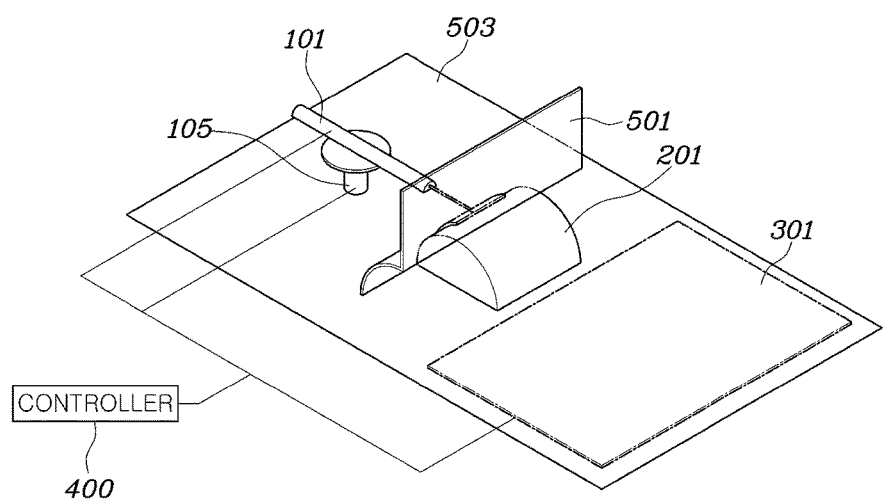
FIG. 1 is a perspective view of a movable switch module according to an embodiment of the present invention.
Figure 2:
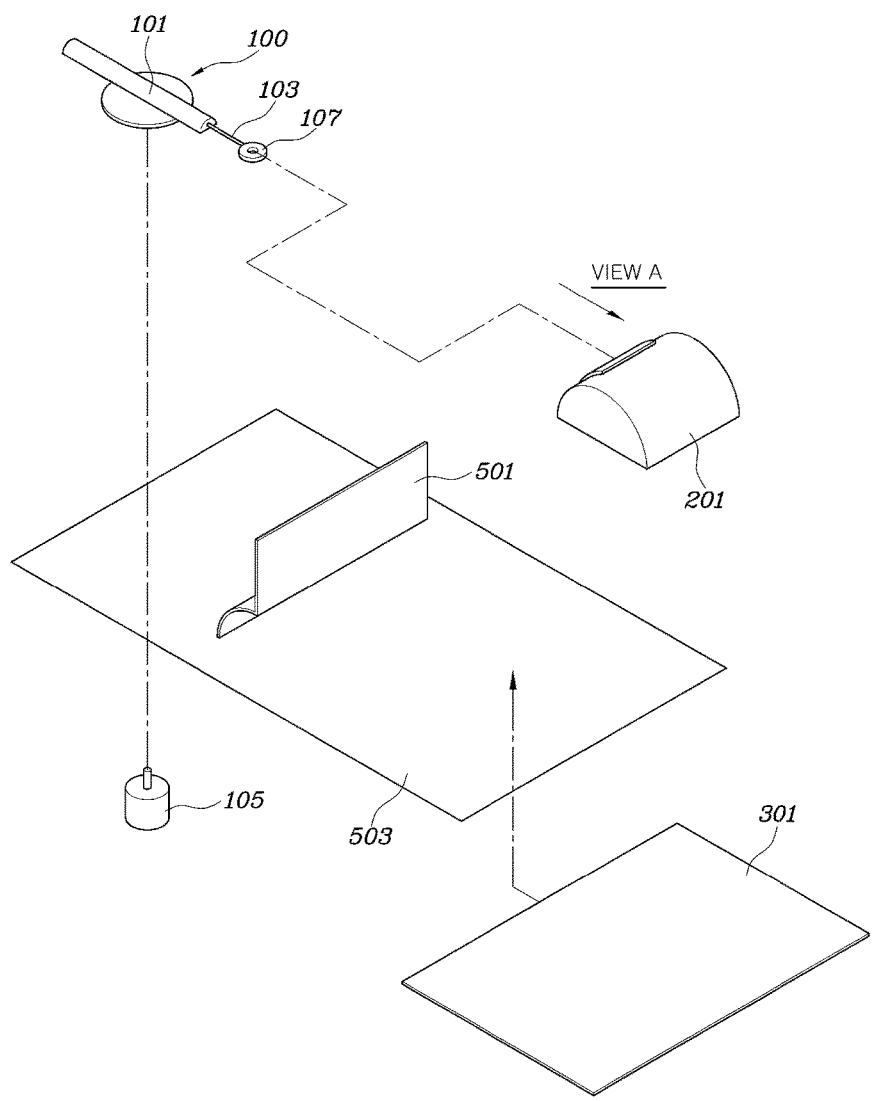
FIG. 2 is an exploded perspective view of the movable switch module according to the embodiment of the present invention.
Figure 3:
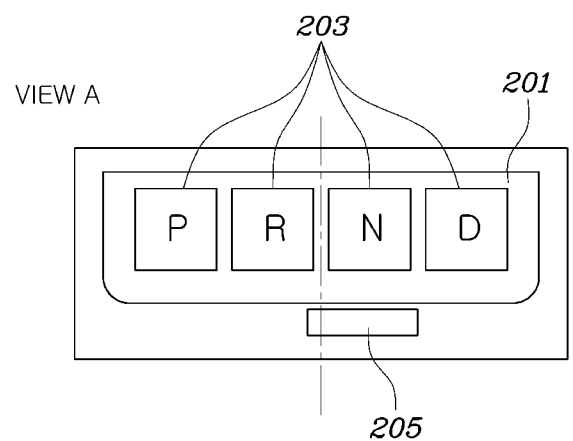
FIG. 3 is a view illustrating electronic transmission switches in the movable switch module according to the embodiment of the present invention.
Figure 4:
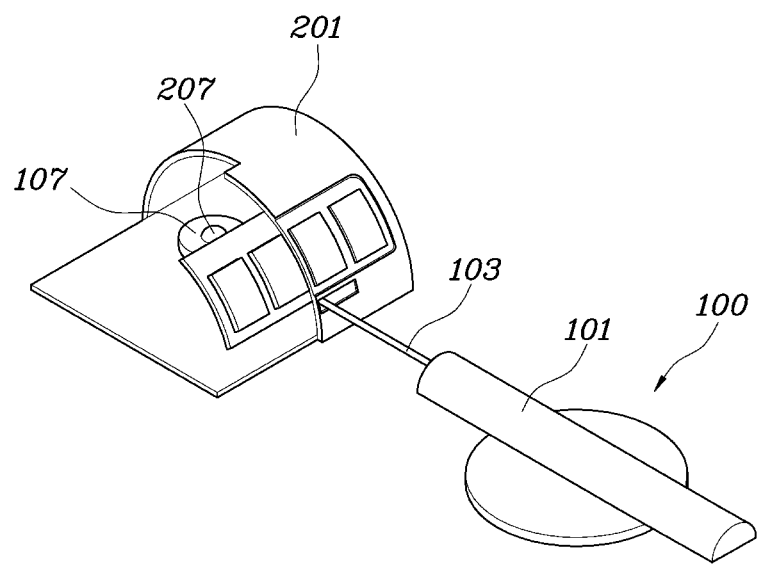
FIG. 4 is a perspective view illustrating a switch box in the movable switch module according to the embodiment of the present invention.
Figure 5:
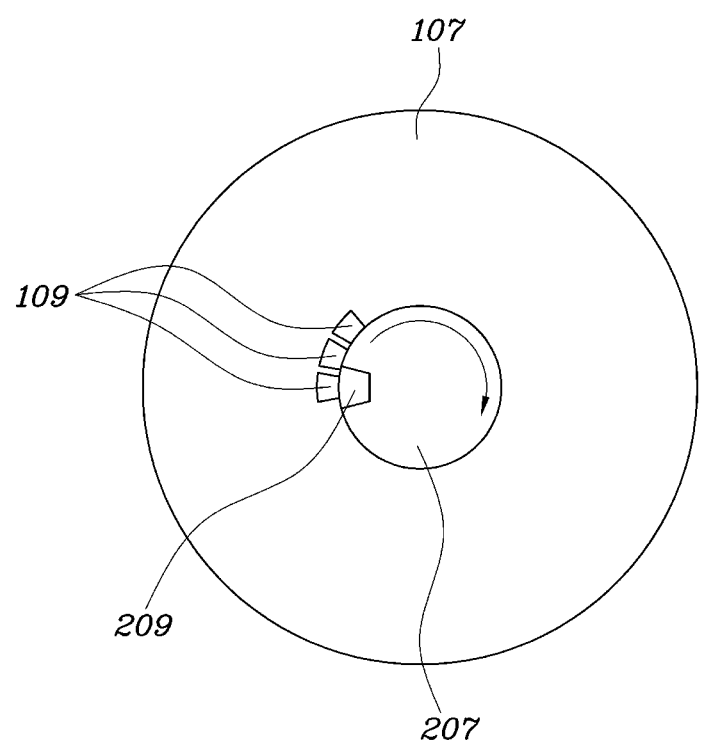
FIG. 5 is a view illustrating rotational couplers in the movable switch module according to the embodiment of the present invention.
Figure 6:
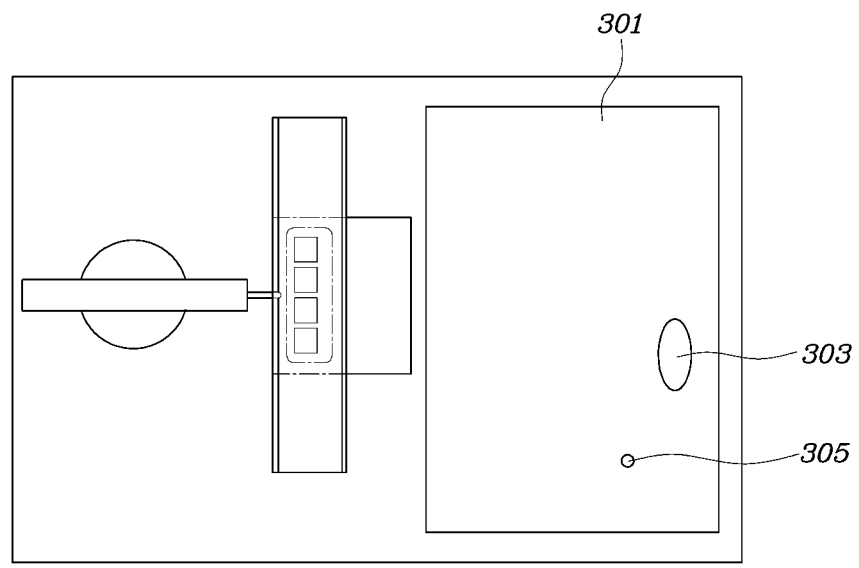
FIG. 6 is a view illustrating a state in which a pressure-sensitive touch pad in the movable switch module according to the embodiment of the present invention determines that the driver intends to operate a switch.
Figure 7:
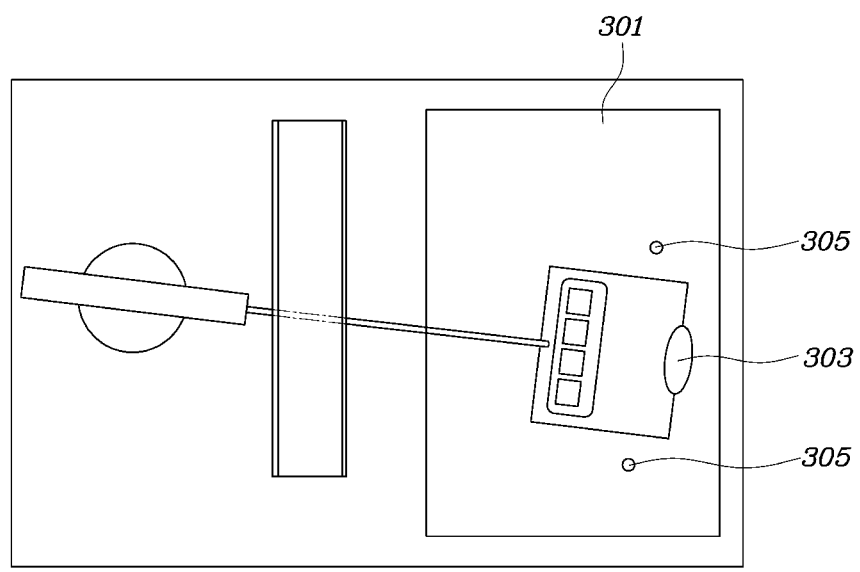
FIG. 7 is a view illustrating a state in which the pressure-sensitive touch pad in the movable switch module according to the embodiment of the present invention determines that the intention of the driver to operate a switch has ended.

FIG. 1 is a perspective view of a movable switch module according to an embodiment of the present invention. FIG. 2 is an exploded perspective view of the movable switch module according to the embodiment of the present invention. FIG. 3 is a view illustrating electronic transmission switches in the movable switch module according to the embodiment of the present invention. FIG. 4 is a perspective view illustrating a switch box in the movable switch module according to the embodiment of the present invention. FIG. 5 is a view illustrating rotational couplers in the movable switch module according to the embodiment of the present invention. FIG. 6 is a view illustrating a state in which a pressure-sensitive touch pad in the movable switch module according to the embodiment of the present invention determines that the driver intends to operate a switch. FIG. 7 is a view illustrating a state in which the pressure-sensitive touch pad in the movable switch module according to the embodiment of the present invention determines that the intention of the driver to operate a switch has ended.

The movable switch module according to the illustrated embodiment of the present invention includes an actuating cylinder 100 including a body 101 disposed inside of a center fascia 501 (e.g., a dashboard panel) of a vehicle and a rod 103 reciprocable such that the rod 103 is extendable to an interior space of the vehicle through the center fascia 501, and a body rotating unit 105 provided at an outer circumferential surface of the body 100 of the actuating cylinder 100 while having a rotating shaft extending perpendicular to a longitudinal direction of the body 101. The movable switch module also includes a switch box 201 connected to an end of the rod 103 of the actuating cylinder 100 such that the switch box 201 is moved in accordance with operation of the actuating cylinder 100, and provided with switches at one side of the switch box 201, a pressure-sensitive touch pad 301 disposed in the interior space at a position spaced apart from the center fascia 501 by a predetermined distance, to sense a variation in pressure applied thereto, and a controller 400 for controlling the actuating cylinder 100 and body rotating unit 105 when sensing an intention of a driver to operate one of the switches, based on a signal from the pressure-sensitive touch pad 301, to control the switch box 201 to protrude to a position where a hand of the driver is located.

In a conventional electronic automatic transmission, the lever thereof protrudes upwards from a console surface 503 and, as such, is operated in a similar manner to a conventional mechanical transmission lever. In this case, the transmission lever occupies a large portion of the console surface 503, similarly to the conventional mechanical transmission lever and, as such, such a configuration reduces advantages of the electronic automatic transmission, which uses a shift-by-wire (SBW) system.

Although this configuration has an advantage in that, when a driver familiar with the conventional mechanical transmission lever operates the automatic transmission lever, it is possible to reduce unfamiliarity in operating the automatic transmission lever, there are problems in that the space for installing a cup holder or the like is reduced, and the layout space for arranging functional buttons is reduced.

Further, since the transmission lever is always in a protruding state, the head or other body portion of the driver may be struck by the transmission lever in the event of a collision. In addition, since characters representing lever positions are indicated on a top surface of the protruded transmission lever, the characters are hidden by a hand of the driver when the driver shifts the transmission lever and, as such, lever position recognizability may be reduced.

In order to solve the above-mentioned problems, a configuration in which buttons corresponding to different gear stages are arranged at the center fascia 501 or console surface 503 has been developed. However, this configuration has a problem with respect to security in that, when the driver operates the buttons using his sense of touch without looking at the buttons, reliability in achieving desired gear stage shifting may be degraded. In particular, the driver often performs a shift operation without looking at the front side and, as such, an accident may occur. Further, in the case of a left-hand drive vehicle, the driver should operate the buttons under the condition that the right hand of the driver is lifted and is moved to the buttons and, as such, there is inconvenience in that the movement range for operating the buttons is large.

Therefore, in the present invention, the switch box 201 is configured to be movable to the position where the hand of the driver is located in order to allow the driver to achieve desired gear shift even under the condition that the arm of the driver is laid on an armrest and, as such, it is possible to reduce gear shift errors while maintaining the advantages of the SBW type electronic automatic transmission.

In detail, referring to FIG. 1, the switch box 201 has a structure capable of being retractable to and extendable from the center fascia 501 in order to provide a reserve space at the console surface 503. In addition, the switch box 201 is also configured to be extendable to or retractable from the interior space in accordance with operation of the actuating cylinder 100. Of course, the hand of the driver cannot always be located in front of the actuating cylinder 100. To this end, the body rotating unit 105 is provided to adjust the direction of the actuating cylinder 100. A power supply source such as a motor is connected to the actuating cylinder 100 or body rotating unit 105, and the power supply source is controlled by the controller, and, as such, the switch module can be operated in a motor-driven manner.

When the controller 400 continuously receives, from the pressure-sensitive touch pad 301, a first pressure signal 303 corresponding to a first predetermined pressure area or more and a second pressure signal 305 corresponding to a second predetermined pressure area or more for a predetermined time or more, the controller may determine that the driver intends to operate the switch module.

On the other hand, when the controller 400 continuously receives, from the pressure-sensitive touch pad 301, one first pressure signal 303 corresponding to the first predetermined pressure area or more and two second pressure signals 305 each corresponding to the second predetermined pressure area or more for a predetermined time or more, the controller 400 may determine that the intention of the driver to operate the switch module has ended. In this case, the controller 400 controls the actuating cylinder 100 and body rotating unit 105, to retract the switch box 201. Electronic gear shift switches 203 may be provided at the switch box 201. The electronic gear shift switches 203 may be disposed to be directed to one side of the center fascia 501.

The first and second pressure signals 303 and 305 are distinguished from each other by contact areas recognized by the touch pad 301. Referring to FIGS. 6 and 7, the first pressure signal 303 is a pressure signal corresponding to the palm of the hand of the driver when the hand of the driver is laid on the touch pad 301, whereas the second pressure signal 303 is a pressure signal corresponding to the tip of a finger. This distinction may be achieved based on values obtained through various experiments and statistical examinations.

This will be described in more detail through the following example. When it is desirable to perform gear shifting, the driver waits for a predetermined time under the condition that the palm of the hand and the thumb simultaneously touch the pressure-sensitive touch pad 301. The predetermined time may be set through various and repeated experiments. Preferably, the predetermined time is 2 seconds. In this case, the hand may be arranged in a manner that the driver would use to grasp a computer mouse. The controller 400 moves the switch box 201 to the position where the hand of the driver is located, based on the first pressure signal 303 and second pressure signal 305 and, as such, allows the driver to operate the switch box 201.

When operation of the switch box 201 is completed, the driver waits for a predetermined time under the condition that the little finger additionally contacts the pressure-sensitive touch pad 301, to send one first pressure signal 303 and two second pressure signals 305. In this case, the controller 400 determines that the intention of the driver to operate the switch box 201 has ended, and then retracts the switch box 201 to an original position.

In addition, as illustrated in FIGS. 1 and 2, the switches 203 are arranged to be directed to one side of the center fascia 501, to allow the driver to easily operate the switches 203 using the index finger, middle finger and ring finger. Accordingly, the driver can operate a desired one of the switches without looking at the switches.

A through hole 205, which extends in a width direction of the vehicle body, may be formed through an outer wall of the switch box 201, to allow the rod 103 of the actuating cylinder 100 to be connected to the inside of the switch box 201 through the through hole 205. The through hole 205 may be formed at a position biased to the right side in the width direction of the vehicle body. The maximum rotation range of the switch box 201 may be adjusted in accordance with the length of the through hole 205 extending in the width direction of the vehicle body.

Rotational couplers 107 and 207 are provided at an end of the rod 103 and the switch box 201, to couple the rod 103 to the switch box 201 such that the switch box 201 is rotatable with respect to the end of the rod 103.

The figure of the hand laid on the armrest or console box may be varied in accordance with the length of the arm of the driver or the personal figure of the wrist of the driver. For this reason, when the hand of the driver is laid on the pressure-sensitive touch pad 301, the direction of the hand may also be varied.

Referring to FIG. 4, the rotational couplers 107 and 207 are provided to make the direction of the hand of the driver correspond to the direction of the switch box 201 and, as such, the switch box 201 is rotated to a position allowing the driver to conveniently operate the switch box 201. However, when the switch box 201 continuously rotates without restriction, disconnection or the like may be generated. For this reason, the rotation range of the switch box 201 is preferably limited to a predetermined range.

In the present invention, the through hole 205 having a length corresponding to the rotation range of the switch box 201 is provided to limit the rotation range through interference between the switch box 201 and the rod 103 of the actuating cylinder 100. Taking into consideration the case in which the right arm is laid on the rest in a left-hand drive vehicle, the direction of the right hand is generally inclined toward the assistant's seat. To this end, in the present invention, the through hole 205 is formed to be biased to the right side with respect to the center of the switches and, as such, the rotation range of the switch box 201 may be adjusted such that the clockwise rotation range of the switch box 201 is greater than the counterclockwise rotation range of the switch box 201.

The rotational couplers 107 and 207 may be a coupling ring and a central protrusion, respectively. In this case, the coupling ring 107 is coupled to the protrusion 207 while being fitted around the protrusion 207 and, as such, rotational force and coupling force are provided between the actuating cylinder 100 and the switch box 201.

Referring to FIG. 4, the central protrusion 207 may be fixed to the switch box 201, whereas the coupling ring 107 may be provided at the rod 103 of the actuating cylinder 100. Magnetic members having opposite polarities may be provided at the inner circumferential surface of the coupling ring 107 and the outer circumferential surface of the central protrusion 207, respectively. In this case, it is possible to determine a desired rotation amount of the switch box 201 when the switch box 201 rotates, by arranging the magnetic members along the inner circumferential surface of the coupling ring 107 and the outer circumferential surface of the central protrusion 207 to be uniformly spaced apart from one another by a predetermined distance.

In an embodiment of the present invention, as illustrated in FIG. 5, magnetic members 109 are provided at the inner circumferential surface of the coupling ring 107, and a magnetic member 209 having opposite polarity to that of the magnetic members 109 are provided at the outer circumferential surface of the central protrusion 207. In this case, the magnetic members 109 are arranged along the inner circumferential surface of the coupling ring 107 to be uniformly spaced apart from one another by a predetermined distance. Accordingly, it is possible to determine a desired rotation range of the switch box 201 when the switch box 201 rotates. When rotation is completed in a state in which the switch box 201 rotates a desired rotation range, attraction is generated between the magnetic member 209 provided at the rotational protrusion 207 and a corresponding one of the magnetic members 109 provided at the coupling ring 107. Accordingly, the switch box 201 is held at a desired position.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A movable switch module for a vehicle, comprising:
    an actuating cylinder comprising a body disposed behind a center fascia and a rod reciprocable such that the rod is extendable to an interior space in a cabin area of the vehicle through the center fascia;
    a body rotating unit provided at an outer circumferential surface of the body of the actuating cylinder while having a rotating shaft extending perpendicular to a length of the body;
    a switch box connected to an end of the rod of the actuating cylinder such that the switch box is moved in accordance with operation of the actuating cylinder, and provided with switches at one side of the switch box;
    a pressure-sensitive touch pad disposed in the interior space at a position spaced apart from the center fascia by a predetermined distance, to sense a variation in pressure applied thereto; and
    a controller for controlling the actuating cylinder and the body rotating unit when sensing an intention of a driver to operate one of the switches, based on a signal from the pressure-sensitive touch pad, to control the switch box to protrude to a position where a hand of the driver is located on the pressure-sensitive touch pad,
    wherein the center fascia is disposed between the body of the actuating cylinder and the switch box, and the switch box is extended to the hand position, or retracted after being operated with respect to the center fascia through the actuating cylinder, by control of the controller.

2. The movable switch module according to claim 1, wherein the controller determines that the driver intends to operate the switch module, when the controller continuously receives, from the pressure-sensitive touch pad, a first pressure signal corresponding to a first predetermined pressure area and a second pressure signal corresponding to a second predetermined pressure area larger than the first predetermined pressure area.

3. The movable switch module according to claim 1, wherein the controller determines that an intention of the driver to operate the switch module has ended, when the controller continuously receives, from the pressure-sensitive touch pad, one first pressure signal corresponding to a first predetermined pressure area and two second pressure signals each corresponding to two second predetermined pressure areas larger than the first predetermined pressure area, and then controls the actuating cylinder and the body rotating unit, based on the determination, to retract the switch box.

4. The movable switch module according to claim 1, wherein the switches provided at the switch box control an electronic gear shift.

5. The movable switch module according to claim 1, wherein the switches of the switch box are arranged to one side of the center fascia which faces a center of a cabin.

6. The movable switch module according to claim 1, wherein a through hole is formed through an outer wall of the switch box such that the through hole extends in a parallel direction with a width of a vehicle body, to allow the rod of the actuating cylinder to be connected to an inside of the switch box through the through hole.

7. The movable switch module according to claim 6, further comprising:
    rotational couplers provided between an end of the rod and the switch box, to couple the rod to the switch box such that the switch box is rotatable with respect to the end of the rod.

8. The movable switch module according to claim 6, wherein the through hole is formed at one side of the switch box.

9. The movable switch module according to claim 7, wherein a rotation range of the switch box is determined in accordance with a length of the through hole extending in the width direction of the vehicle body.

10. The movable switch module according to claim 7, wherein the rotational couplers comprise a coupling ring and a central protrusion, respectively, the protrusion is coupled with the switch box, and the coupling ring is rotatably coupled to the protrusion to allow the switch box to be rotatable about the end of the rod of the actuating cylinder.

11. The movable switch module according to claim 10, wherein magnetic members having opposite polarities are provided at an inner circumferential surface of the coupling ring and an outer circumferential surface of the central protrusion such that the polarity of a first magnet surface on the inner circumferential surface facing toward the central protrusion is opposite to the polarity of a second magnet surface on the central protrusion facing toward the inner circumferential surface, and the magnetic members provided at the inner circumferential surface of the coupling ring and the outer circumferential surface of the central protrusion are uniformly spaced apart from one another by a predetermined distance along the corresponding circumferential surface such that, when the switch box rotates, a rotation amount of the switch box is determined.

* * * * *